United States Patent [19]

Ueda

[11] 4,339,257

[45] Jul. 13, 1982

[54] METHOD OF PRODUCING CURVED AND PARTLY COLORED GLASS SHEET

[75] Inventor: Kazuo Ueda, Matsusaka, Japan

[73] Assignee: Central Glass Company, Limited, Uve, Japan

[21] Appl. No.: 243,809

[22] Filed: Mar. 16, 1981

[30] Foreign Application Priority Data

Mar. 17, 1980 [JP] Japan .................................. 55-33628

[51] Int. Cl.$^3$ ............................................. C03C 17/04
[52] U.S. Cl. ........................................ 65/60.5; 65/24; 65/106; 65/60.51; 65/60.53
[58] Field of Search ............... 65/24, 106, 60.51, 60.5, 65/60.53

[56] References Cited

U.S. PATENT DOCUMENTS 3,244,547  4/1966  Orr et al. ............................ 65/60.51
3,282,014  11/1966  Bamford et al. ................ 65/60.53 X
3,442,748  5/1969  D'Huart .................................. 65/24

FOREIGN PATENT DOCUMENTS 7006709  2/1977  Japan ...................................... 65/24

*Primary Examiner*—Arthur D. Kellogg
*Attorney, Agent, or Firm*—Fleit & Jacobson

[57] ABSTRACT

A method of producing a curved glass sheet having a colored coating layer formed in a selected region, such as a marginal region in the case of a window glass for the rear window of an automobile, by applying a coloring agent comprising inorganic pigment and glass frit of a low melting temperature onto a flat glass sheet surface, heating the glass sheet and press-bending the heat-softened glass sheet while the applied coloring agent is in fused state. As a novel feature, the coloring agent comprises alumina powder which adheres to the surfaces of the glass frit particles until fusion of the glass frit on the glass sheet surface. The presence of alumina powder prevents a shaping tool pressed against the glass sheet from adhering to the fused layer of the coloring agent.

12 Claims, No Drawings

METHOD OF PRODUCING CURVED AND PARTLY COLORED GLASS SHEET

BACKGROUND OF THE INVENTION

This invention relates to a method of producing a partly colored and at least partly curved glass sheet, in which method a colored coating layer is formed simultaneously with press-shaping of glass sheet. This method is suitable to the production of window glasses for vehicles.

For vehicle windows and particularly for rear and side windows of automobiles, recently there is an increasing trend of employing a partly colored window glass, which is a curved glass sheet having a colored and opaque or translucent coating layer formed for ornamental or aesthetic purposes on a surface of the glass sheet to become the inboard side of the window glass in a marginal region along the entire periphery.

Usually such a colored coating layer is formed at the stage of press-shaping a flat glass sheet of a definite profile into a desirably curved sheet, by using a colored paste prepared by kneading a mixture of an inorganic pigment, a glass frit of a relatively low melting temperature and a vehicle such as an oil. As a minor modification, the inorganic pigment may be incorporated into the glass frit by adding the pigment to a powdery composition for the preparation of the frit. First, the paste is applied onto the flat glass sheet by, for example, a screen-printing technique to cover the intended marginal region of the glass surface with a thin layer of this paste. After drying of the colored paste layer, the glass sheet is heated to a temperature sufficient for softening of the glass sheet and melting of the glass frit contained in the colored paste. Then the heated glass sheet is subjected to a usual press-bending operation wherein a male shaping tool is pressed against the paste-applied surface of the glass sheet. The fused glass frit serves as a binder for the inorganic pigment particles and strongly adheres to the glass sheet surface. When cooled, the marginal region of the concave side of the curved glass sheet is coated closely with a colored and film-like glass layer.

However, practical applications of this method revealed a problem that often difficulty arises in parting of the shaping tool from the press-shaped glass sheet because of adhesion of the tool to the glass sheet. Since an unwanted pulling force is exerted on the shaped glass sheet in such a case, the shaped glass sheet tends to undergo unintended deformation and becomes unsatisfactory in the precision of its curved shape. The reason for adhesion of the shaping tool to the shaped glass sheet is a fact that during the press-shaping operation the fused glass frit as a binder component of the coloring agent adheres not only to the heated glass sheet surface but also to the shaping tool. In other words, the fused layer of the coloring agent works as an adhesive layer between the shaping tool and the glass sheet.

SUMMARY OF THE INVENTION

It is an object of the present invention to provide an improved method of producing a partly colored and either entirely or partly curved glass sheet, which method is analogous to the above described conventional method from a principal viewpoint but does not involve difficulty in parting the shaping tool from the shaped glass sheet and therefore does not suffer from unintended deformation of the desirably shaped glass sheet.

A method according to the invention includes the steps of covering a selected region of a surface of a flat glass sheet with a layer of a coloring agent which comprises an inorganic pigment and a glass frit which is lower in melting temperature than the glass sheet, heating the glass sheet so as to soften the glass sheet and fuse the glass frit contained in the aforementioned layer and press-shaping the heated glass sheet into a desirably curved shape so as to allow the fused glass frit containing therein the pigment to adhere to the glass sheet surface, and this method is characterized in that the coloring agent comprises an alumina powder which adheres to the surfaces of the particles of the glass frit until fusion of the glass frit on the glass sheet surface.

As will be understood from the above statement, a sole but important difference of the method according to the invention from the initially described conventional method resides in the presence of an alumina powder on the surfaces of the particles of the glass frit contained in the coloring agent.

When the coloring agent according to the invention is fused on the surface of the glass sheet, the alumina powder remains in the form of solid particles and covers a large part of the outer surface area of the fused coloring agent layer and prevents the shaping tool pressed against the glass sheet from coming into direct contact with the fused layer in this part. Therefore, the shaping tool does not adhere to the fused layer and can easily be parted from the shaped glass sheet without exerting a pulling force of an appreciable magnitude on the glass sheet. On the other hand, the presence of solid alumina particles does not constitute a significant hindrance to the occurrence of strong adhesion of the fused glass frit to the glass sheet surface and adhesion between the fused frit particles because the fused glass frit under the shaping pressure can move through gaps between the alumina particles.

The improvement according to the invention is remarkably effective for prevention of deformation of the shaped glass sheet attributed to the adhesion of the shaping tool to the coloring agent layer. Besides, in the method according to the invention it becomes possible to employ a higher heating temperature for softening of the glass sheet than in the conventional method without increasing the probability of adhesion of the shaping tool to the shaped glass sheet, and therefore this method becomes practicable even when the glass sheet has a considerably large thickness and/or is required to be press-shaped into a rather complicated shape or with relatively small radii of curvatures.

The present invention has selected alumina ($Al_2O_3$) as the adhesion-preventing or parting agent for the following reasons. First, alumina has a very high melting temperature, i.e. about 2000° C. Second, alumina has little influence on the color of the coating layer. Furthermore, in the case of recovering defective products of this method as cullet for use in a separate glass-producing process the presence of a small amount of alumina in the cullet is not detrimental to the quality of the new glass products as will be understood from the fact that often alumina is used as an ingredient of a glass composition.

DESCRIPTION OF THE PREFERRED EMBODIMENTS

Except for the presence of an alumina powder, a coloring agent for use in the method according to the invention is similar to the coloring agents useful in the initially described conventional method. It is convenient to use a coloring agent in the form of a paste prepared by using a suitable vehicle such as a drying oil. A suitable coloring agent can be obtained by using a colored glass frit prepared by fusion of a powdery mixture of an inorganic pigment and raw materials of a low melting temperature glass composition. Alternatively, use may be made of a mixture of an inorganic pigment and a colorless glass frit.

It is suitable to employ a printing method such as a screen-printing method to cover a selected region of a glass sheet surface, such as a marginal region along the entire periphery of the glass sheet, with a coloring agent according to the invention in the form of a paste.

In any case, it is required that at the stage of applying a coloring agent according to the invention onto a glass sheet surface an alumina powder be present on the surfaces of the particles of the glass frit contained in the coloring agent in a firmly adhering state. Therefore, in the case of a paste it is necessary to make alumina powder adhere to the glass frit particles in advance of mixing the frit with a vehicle such as oil. The most suitable method for the achievement of sufficiently strong and uniform adhesion of alumina powder to glass frit particles is to heat a mixture of an alumina powder and a low melting temperature glass frit, which may be a colored frit containing an inorganic pigment, to a temperature somewhat higher than the softening temperature of the glass frit (but lower than the melting temperature of the glass frit) with continued vibration of the powdery mixture under heating. As to the strength of adhesion of alumina powder to the surfaces of the glass frit particles, a minimum requirement is that the alumina powder does not part from the frit particles during preparation of a colored paste and during application, by screen-printing for example, of the paste onto a glass sheet surface.

The particle size of alumina powder for use in the present invention is usually smaller than the particle size of the glass frit to which the alumina powder is caused to adhere, but it is also possible to use an alumina powder larger in particles size than the glass frit. However, neither an excessively fine powder of alumina nor excessively coarse powder of alumina is desirable. In the case of an excessively fine alumina powder, at the stage of press-shaping of the glass sheet a large portion of the alumina powder remains in the fused layer of the coloring agent, so that the outer surface of this layer is not sufficiently covered by the alumina powder and therefore adheres to the shaping tool. The use of an excessively coarse alumina powder results in insufficiency of the strength of adhesion of the colored coating layer to the glass sheet surface because the coarse alumina particles hinder the adhesion of the fused coloring agent to the glass sheet and adhesion between fused frit particles. It is preferable to use an alumina powder having a mean particle size in the range from about 0.5 microns to about 10 microns.

In the present invention, a preferable range of the weight ratio of the alumina powder to the glass frit in a coloring agent is from 0.01:1 to 0.3:1.

The following example is presented to illustrate the present invention.

EXAMPLE

A colored glass frit of a relatively low melting temperature was prepared through the steps of fusing a mixture of pigment components consisting of 8.6 parts by weight of $Cr_2O_3$ (in this example, the amount of every material is given by weight), 4.1 parts of CuO and 0.05 parts of NiO and glass components consisting of 23 parts of $SiO_2$, 41 parts of PbO and 6.8 parts of $B_2O_3$, cooling the fused glass containing the pigment components dispersed therein to allow solidification and pulverizing the solidified glass into particles about 6 microns in diameter.

Next, 83.5 parts of this glass frit was mixed with 5.5 parts of a fine powder of alumina having a mean particle size of about 1 micron, and the resultant mixture was heated to a temperature slightly higher than the softening temperature of the glass frit, with continued vibration of the mixture, to cause adhesion of the alumina particles to the surfaces of the particles of the glass frit.

Then, a colored (dark greenly) paste was prepared by adding 10.8 parts of a drying oil to the alumina-treated glass frit and kneading the resultant mixture.

This colored paste was applied onto a surface of a flat and transparent glass sheet by a screen-printing technique, followed by drying of the colored paste layer formed on the glass sheet. Of course the melting temperature of this glass sheet was higher than the melting temperature of the glass frit used in the colored paste. The printing of the colored paste was performed on a number of glass sheets without altering the materials and printing conditions to obtain a sufficient number of samples for use in the experiment described below.

For the sake of comparison, another colored paste was prepared generally by the above described process except for omission of the treatment of the glass frit with the alumina powder, so that this paste did not contain alumina powder.

By using the same kind of glass sheet and the same printing method as in the application of the alumina-containing paste, the paste not containing alumina was applied to a number of glass sheet samples.

The two kinds of paste-applied glass sheet samples were individually heated to a predetermined temperature higher than the softening temperature of the glass sheet and melting temperature of the glass frit and subjected to a conventional press-bending operation wherein a male shaping tool was pressed against the paste-applied surface of the glass sheet. Each kind of the glass sheet samples were divided into three groups to perform the press-bending operation at three differently determined heating temperatures, but the other conditions of the operation such as the design of the shaping tool and pressure for bending were maintained constant.

In this experiment, careful observation was made on the manner of parting of the shaping tool from the coated surface of the shaped glass sheet and possible deformation of the shaped glass sheet resulting from adhesion of the shaping tool to the fused layer of the coloring agent on the glass sheet surface. The results of this experiment are summarized in the following table, wherein "defective" means the occurrence of deformation of the shaped glass sheet upon parting of the shaping tool from the glass sheet.

| Temperature Glass Sheet at Pressing Stage | Alumina Powder | Number of Samples | Defective Products |
| --- | --- | --- | --- |
| 600° C. | used | 20 | 0/20 |
| 600° C. | not used | 20 | 1/20 |
| 640° C. | used | 20 | 0/20 |
| 640° C. | not used | 20 | 6/20 |
| 650° C. | used | 20 | 0/20 |
| 650° C. | not used | 20 | 13/20 |

The results of this experiment demonstrate that the use of alumina powder in the manner as herein disclosed is surprisingly effective for decrease of defective products and, moreover, makes it possible to considerably raise the heating temperature for the press-shaping operation when such is desired to press-shape, for example, a glass sheet of a relatively large thickness. In contrast, it can be seen that in the conventional method the probability of deformation of the press-shaped glass sheet increases sharply as the heating temperature is raised.

What is claimed is:

1. A method of producing a partly colored and at least partly curved glass sheet, the method including the steps of covering a selected region of a surface of a flat glass sheet with a layer of a coloring agent which comprises an inorganic pigment and a glass frit which is lower in melting temperature than the glass sheet, heating the glass sheet so as to soften the glass sheet and fuse the glass frit contained in said layer, and press-shaping the heated glass sheet into a desirably curved shaped so as to allow the fused glass frit containing therein said pigment to adhere to the glass sheet surface, characterized in that said coloring agent further comprises an alumina powder which adheres to the surfaces of the particles of said glass frit until fusion of said glass frit on the sheet glass surface.

2. A method according to claim 1, wherein said alumina powder is caused to adhere to the particles of said glass frit by mixing said alumina powder with said glass frit and heating the resultant mixture to a temperature higher than the softening temperature of said glass frit but lower than the melting temperature of said glass frit.

3. A method according to claim 2, wherein the heating of said mixture is performed with continued vibration of said mixture.

4. A method according to claim 1, wherein said pigment is incorporated in said glass frit through the steps of heating a powdery mixture of said pigment and raw materials for said glass frit to a temperature high enough to melt said raw materials, thereby dispersing said pigment in the molten materials, cooling the molten materials to allow solidification and pulverizing the solidified materials.

5. A method according to claim 1, wherein said pigment in said coloring agent is in the form of powder mixed with the particles of said glass frit.

6. A method according to claim 4 or 5, wherein said coloring agent further comprises a fluid vehicle and is in the form of a paste at the time of its application to the glass sheet.

7. A method according to claim 6, wherein said coloring agent is applied to the glass sheet by a printing method.

8. A method according to claim 7, wherein said printing method is a screen-printing method.

9. A method according to claim 1, wherein said alumina powder has a mean particle size in the range from about 0.5 microns to about 10 microns.

10. A method according to claim 9, wherein the weight ratio of said alumina powder to said glass frit in said coloring agent is in the range from 0.01:1 to 0.3:1.

11. A method according to claim 1, wherein said selected region is a marginal region.

12. A method according to claim 11, wherein said partly colored and at least partly curved glass sheet is a window glass for a window of an automobile.

* * * * *